United States Patent
Adamson et al.

(10) Patent No.: US 7,008,726 B2
(45) Date of Patent: Mar. 7, 2006

(54) SECONDARY BATTERY ELECTRODE ACTIVE MATERIALS AND METHODS FOR MAKING THE SAME

(75) Inventors: George Adamson, Henderson, NV (US); Jeremy Barker, Oxfordshire (GB); M. Yazid Saidi, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 59 days.

(21) Appl. No.: 10/763,890

(22) Filed: Jan. 22, 2004

(65) Prior Publication Data

US 2005/0164084 A1    Jul. 28, 2005

(51) Int. Cl.
- *H01M 4/58* (2006.01)
- *H01M 4/54* (2006.01)
- *H01M 6/18* (2006.01)
- *H01M 6/16* (2006.01)
- *C01B 25/10* (2006.01)

(52) U.S. Cl. .................. 429/231.95; 429/220; 429/219; 429/231.5; 429/223; 429/221; 429/322; 429/326; 429/330; 423/301; 423/306

(58) Field of Classification Search ............. 429/231.9, 429/231.95, 220, 219, 231.5, 223, 221, 231.6, 429/322, 325, 326, 330; 423/300, 301, 306, 423/314, 315

See application file for complete search history.

(56) References Cited

U.S. PATENT DOCUMENTS

| | | | |
|---|---|---|---|
| 5,910,382 A | 6/1999 | Goodenough et al. ... | 429/218.1 |
| 6,085,015 A | 7/2000 | Armand et al. ............. | 385/140 |
| 6,136,472 A * | 10/2000 | Barker et al. ............ | 429/218.1 |
| 6,153,333 A | 11/2000 | Barker ..................... | 429/218.1 |
| 6,391,493 B1 | 5/2002 | Goodenough et al. ... | 429/218.1 |
| 2001/0055718 A1 | 12/2001 | Li et al. | |
| 2002/0192553 A1 | 12/2002 | Barker et al. | |
| 2002/0195591 A1 | 12/2002 | Ravel et al. | |
| 2003/0027049 A1 | 2/2003 | Barker et al. | |
| 2003/0190526 A1 | 10/2003 | Saidi et al. | |
| 2003/0190527 A1 | 10/2003 | Pugh et al. | |
| 2003/0190528 A1 | 10/2003 | Saidi et al. | |
| 2003/0215715 A1 | 11/2003 | Barker et al. | |
| 2004/0033360 A1 | 2/2004 | Armand et al. | |

FOREIGN PATENT DOCUMENTS

| | | |
|---|---|---|
| CA | 2200998 A1 | 9/1998 |
| EP | 1 150 367 A2 | 10/2001 |
| JP | 2002117903 A1 | 4/2002 |
| WO | WO 02/27824 A1 | 4/2002 |
| WO | WO 02/083555 A2 | 10/2002 |
| WO | WO 2004/001881 A2 | 12/2003 |

OTHER PUBLICATIONS

J.B.Goodenough et al., "Cathodes for Lithium-Ion Batteries: Some Comparisons", Kenki Kagaku Oyobi Kogyo Butsuri Kagaku vol. 66, No. 12, pp. 1173-1181 (1998).

* cited by examiner

*Primary Examiner*—Patrick Joseph Ryan
*Assistant Examiner*—Thomas H. Parsons
(74) *Attorney, Agent, or Firm*—Michael D. Ross; Roger A. Williams; Cynthia S. Kovacevic

(57) ABSTRACT

The invention provides an electrochemical cell which includes a first electrode and a second electrode which is a counter electrode to said first electrode, and an electrolyte material interposed there between. The first electrode comprises an electrode active material represented by the general nominal formula $A_a[M_m,MI_n,MII_o](XY_4)_dZ_e$, wherein at least one of M, MI and MII is a redox active element, $0<m,n,o\leq 4$, and $\tfrac{1}{2}[V(MI)+V(MII)]=V(M)$, wherein V(M) is the valence state of M, V(MI) is the valence state of MI, and V(MII) is the valence state of MII.

87 Claims, No Drawings

SECONDARY BATTERY ELECTRODE ACTIVE MATERIALS AND METHODS FOR MAKING THE SAME

FIELD OF THE INVENTION

This invention relates to improved materials usable as electrode active materials, methods for making such improved materials, and electrochemical cells employing such improved materials.

BACKGROUND OF THE INVENTION

A battery consists of one or more electrochemical cells, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

Such batteries generally include an electrochemically active material having a crystal lattice structure or framework from which ions can be extracted and subsequently reinserted, and/or permit ions to be inserted or intercalated and subsequently extracted.

Recently, three-dimensionally structured compounds comprising polyanions (e.g., $(SO_4)^{n-}$, $(PO_4)^{n-}$, $(AsO_4)^{n-}$, and the like), have been devised as viable alternatives to oxide-based electrode materials such as $LiM_xO_y$. Examples of such polyanion-based materials include the ordered olivine $LiMPO_4$ compounds, wherein M=Mn, Fe, Co or the like. Other examples of such polyanion-based materials include the NASICON $Li_3M_2(PO_4)_3$ compounds, wherein M=Mn, Fe, Co or the like. Although these classes of lithiated polyanion-based compounds have exhibited some promise as electrode components, many such polyanion-based materials are not economical to produce, afford insufficient voltage, have insufficient charge capacity, exhibit low ionic and/or electrical conductivity, or lose their ability to be recharged over multiple cycles. Therefore, there is a current need for an electrode active material that exhibits greater charge capacity, is economical to produce, affords sufficient voltage, exhibits greater ionic and electrical conductivity, and retains capacity over multiple cycles.

SUMMARY OF THE INVENTION

The present invention is directed to a novel alkali metal-containing electrode active material. The novel active material of the present invention is represented by the nominal general formula:

wherein:
(i) A is selected from the group consisting of elements from Group I of the Periodic Table, and mixtures thereof, and $0 < a \leq 9$;
(ii) at least one of M, MI and MII is a redox active element, $0 < m,n,o \leq 4$, and $\frac{1}{2}[V(MI)+V(MII)]=V(M)$, wherein V(M) is the valence state of M, V(MI) is the valence state of MI, and V(MII) is the valence state of MII;
(iii) $XY_4$ is selected from the group consisting of $X'[O_{4-x},Y'_x]$, $X'[O_{4-y},Y'_{2y}]$, $X''S_4$, $[X_z''',X'_{1-z}]O_4$, and mixtures thereof, wherein:
(a) X' and X''' are each independently selected from the group consisting of P, As, Sb, Si, Ge, V, S, and mixtures thereof;
(b) X'' is selected from the group consisting of P, As, Sb, Si, Ge, V, and mixtures thereof;
(c) Y' is selected from the group consisting of a halogen, S, N, and mixtures thereof; and
(d) $0 \leq x \leq 3$, $0 \leq y \leq 2$, $0 \leq z \leq 1$, and $1 \leq d \leq 3$; and
(iv) Z is selected from the group consisting of a hydroxyl (OH), a halogen, and mixtures thereof, and $0 \leq e \leq 4$;
wherein A, M, MI, MII X, Y, Z, a, m, n, o, d, and e are selected so as to maintain electroneutrality of the material.

This invention also provides electrodes which utilize an electrode active material of this invention. Also provided are batteries having a first electrode that includes the electrode active material of this invention; a second counter-electrode having a compatible active material; and an electrolyte interposed there between. In a preferred embodiment, the novel electrode active material of this invention is used as a positive electrode (cathode) active material, reversibly cycling alkali metal ions with a compatible negative electrode (anode) active material.

DESCRIPTION OF THE INVENTION

It has been found that the novel electrode materials, electrodes, and batteries of this invention afford benefits over such materials and devices among those known in the art. Such benefits include one or more of increased capacity, enhanced cycling capability, enhanced reversibility, enhanced ionic conductivity, enhanced electrical conductivity, and reduced costs. Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

The present invention provides electrode active materials for use in an electricity-producing electrochemical cell. Each electrochemical cell includes a positive electrode, a negative electrode, and an electrolyte in ion-transfer communication with both the positive and the negative electrode, for transferring ionic charge carriers there between. A "battery" refers to a device having one or more electricity-producing electrochemical cells. Two or more electrochemical cells may be combined, or "stacked," so as to create a multi-cell battery.

The electrode active materials of this invention may be used in the negative electrode, the positive electrode, or both. Preferably, the active materials of this invention are used in the positive electrode. As used herein, the terms "negative electrode" and "positive electrode" refer to the electrodes at which oxidation and reduction occur, respectively, during battery discharge; during charging of the battery, the sites of oxidation and reduction are reversed.

Electrode Active Materials

The present invention is directed to a novel alkali metal-containing electrode active material. The novel active material of the present invention is represented by the nominal general formula (I):

 (I)

The term "nominal general formula" refers to the fact that the relative proportion of atomic species may vary slightly, on the order of 2 percent to 5 percent, or more typically, 1 percent to 3 percent. The composition of A, M, MI, MII, $XY_4$ and Z of general formulas (I) through (V) herein, as well as the stoichiometric values of the elements of the active material, are selected so as to maintain electroneutrality of the electrode active material. The stoichiometric values of one or more elements of the composition may take on non-integer values.

For all embodiment herein, moiety A is selected from the group consisting of elements from Group I of the Periodic Table, and mixtures thereof. As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. In one embodiment, A is selected from the group consisting of Li (Lithium), Na (Sodium), K (Potassium), and mixtures thereof. A may be a mixture of Li with Na, a mixture of Li with K, or a mixture of Li, Na and K. In another embodiment, A is Na, or a mixture of Na with K. In one preferred embodiment, A is Li.

As used herein, the recitation of a genus of elements, materials or other components, from which an individual component or mixture of components can be selected, is intended to include all possible sub-generic combinations of the listed components, and mixtures thereof. In addition, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

Removal of an amount of alkali metal (A) from the electrode active material is accompanied by a change in oxidation state of at least one of the "redox active" elements in the active material, as defined herein below. The amount of redox active material available for oxidation/reduction in the active material determines the amount of alkali metal (A) that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

A sufficient quantity of alkali metal (A) should be present so as to allow all of the "redox active" elements of M, MI and MII (as defined herein below) to undergo oxidation/reduction. In one embodiment, $0<a\leq9$. In another embodiment, $0<a\leq3$. In yet another embodiment, $0<a\leq1$. Unless otherwise specified, a variable described herein algebraically as equal to ("="), less than or equal to ("$\leq$"), or greater than or equal to ("$\geq$") a number is intended to subsume values or ranges of values about equal or functionally equivalent to the stated number.

In general, the amount (a) of alkali metal (A) in the active material varies during charge/discharge. Where the active materials of the present invention are synthesized for use in preparing an electrochemical cell in a discharged state, such active materials are characterized by a relatively high value of "a", with a correspondingly low oxidation state of the redox active components of the active material. As the electrochemical cell is charged from its initial uncharged state, an amount (a') of alkali metal (A) is removed from the active material as described above. The resulting structure, containing less alkali metal (i.e., a–a') than in the as-prepared state, and at least one of the redox active components having a higher oxidation state than in the as-prepared state, essentially maintains the original value of c. The active materials of this invention include such materials in their nascent state (i.e., as manufactured prior to inclusion in an electrode) and materials formed during operation of the battery (i.e., by insertion or removal of alkali metal (A)).

For all embodiments described herein, at least one of M, MI and MII is a redox active element, and ½[V(MI)+V (MII)]=V(M), wherein V(M) is the valence state of M, V(MI) is the valence state of MI, and V(MII) is the valence state of MII. As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell. In the embodiment described by general formula (I), $0<m,n,o\leq4$.

Redox active elements useful herein with respect to M, MI and MII include, without limitation, elements from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium), Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. As referred to herein, "include," and its variants, is intended to be non-limiting, such that recitation of items in a list is not to the exclusion of other like items that may also be useful in the materials, compositions, devices, and methods of this invention.

In one embodiment, M, MI and MII are each a redox active element. In another embodiment, at least one of M, MI and MII is a non-redox active element. As referred to herein, "non-redox active elements" include elements that are capable of forming stable active materials, and do not undergo oxidation/reduction when the electrode active material is operating under normal operating conditions.

Among the non-redox active elements useful herein include, without limitation, those selected from Group 1 elements, particularly Li, K, Na, Ru (Rubidium), Cs (Cesium); Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium), Group 15 elements, particularly As (Arsenic), Sb (Antimony), and Bi (Bismuth); Group 16 elements, particularly Te (Tellurium); and mixtures thereof.

In one embodiment, each of M, MI and MII is a redox active element, MI is selected from the group consisting of redox active elements with a 1+ oxidation state, 2+ oxidation state, 3+ oxidation state and mixtures thereof, and ½[V(MI)+V(MII)]=V(M), wherein V(M) is the valence state of M, V(MI) is the valence state of MI, and V(MII) is the valence state of MII. In an alternate embodiment, M and/or MII is a non-redox active element.

In one embodiment, each of M, MI and MII is a redox active element, MI is selected from the group consisting of $Cu^{1+}$, $Ag^{1+}$ and mixtures thereof, M and MII are each redox active, and ½[V(MI)+V(MII)]=V(M). In an alternate embodiment, M and/or MII is a non-redox active element.

In another embodiment, each of M, MI and MII is a redox active element, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, M and MII are each redox active, and ½[V(MI)+V(MII)]=V(M). In an alternate embodiment, M and/or MII is a non-redox active element.

In another embodiment, each of M, MI and MII is a redox active element, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and mixtures thereof, M and MII are each redox active, and ½[V(MI)+V(MII)]=V(M). In an alternate embodiment, M and/or MII is a non-redox active element.

In one embodiment, M and MII are redox active elements, MI is selected from the group consisting of non-redox active elements with a 1+ oxidation state, 2+ oxidation state, 3+ oxidation state and mixtures thereof, and ½[V(MI)+V(MII)]=V(M). In an alternate embodiment, M and/or MII is a non-redox active element.

In another embodiment, MI is selected from the group consisting of $Li^{1+}$, $K^{1+}$, $Na^{1+}$, $Ru^{1+}$, $Cs^{1+}$, and mixtures thereof, M and MII are each non-redox active, and ½[V(MI)+V(MII)]=V(M). In a particular embodiment, MI is selected from the group consisting of $K^{1+}$, $Na^{1+}$, and mixtures thereof. In an alternate embodiment, M or MII is a non-redox active element.

In another embodiment, MI is selected from the group consisting of $Be^{2+}$, $Mg^{2+}$, $Ca^{2+}$, $Sr^{2+}$, $Ba^{2+}$, $Zn^{2+}$, $Cd^{2+}$, $C^{2+}$, $Ge^{2+}$, and mixtures thereof, M and MII are each redox active, and ½[V(MI)+V(MII)]=V(M). In a particular embodiment, MI is selected from the group consisting of $Be^{2+}$, $Mg^{2+}$, $Ca^{2+}$, $Sr^{2+}$, $Ba^{2+}$, and mixtures thereof. In another particular embodiment, MI is selected from the group consisting of $Zn^{2+}$, $Cd^{2+}$, and mixtures thereof. In yet another particular embodiment, MI is selected from the group consisting of $C^{2+}$, $Ge^{2+}$, and mixtures thereof. In an alternate embodiment, M or MII is a non-redox active element.

In yet another embodiment, MI is selected from the group consisting of $Sc^{3+}$, $Y^{3+}$, $B^{3+}$, $Al^{3+}$, $Ga^{3+}$, $In^{3+}$ and mixtures thereof, M and MII are each redox active, and ½[V(MI)+V(MII)]=V(M). In an alternate embodiment, M or MII is a non-redox active element.

In each of the embodiments described herein, M may be partially substituted by an equivalent stoichiometric amount of MI and MII, whereby the active material is represented by the nominal general formula (II):

$$A_a[M_{m-n-o}MI_nMII_o](XY_4)_dZ_e, \quad (II)$$

and wherein the stoichiometric amount of one or more of the other components (e.g. A, $XY_4$ and Z) in the active material must be adjusted in order to maintain electroneutrality of the material.

However, in each of the embodiments described herein, M may be partially substituted by MI and MII by an "oxidatively" equivalent amount of MI and MII, whereby the active material is represented by the nominal general formula (III):

$$A_a\left[M_{m-\frac{n}{V(MI)}-\frac{o}{V(MI)}}, MI_{\frac{n}{V(MI)}}, MII_{\frac{o}{V(MII)}}\right](XY_4)_dZ_e, \quad (III)$$

and wherein V(M) is the valence state of M, V(MI) is the valence state of MI, and V(MII) is the valence state of MII.

In all embodiments described herein, $XY_4$ is an anion selected from the group consisting of $X'[O_{4-x,}Y'_x]$, $X'[O_{4-y,}Y'_{2y}]$, $X''S_4$, $[X_z''',X'_{1-z}]O_4$, and mixtures thereof, wherein:

(a) X' and X''' are each independently selected from the group consisting of P, As, Sb, Si, Ge, V, S, and mixtures thereof;

(b) X'' is selected from the group consisting of P, As, Sb, Si, Ge, V, and mixtures thereof;

(c) Y' is selected from the group consisting of a halogen, S, N, and mixtures thereof; and (d) $0 \leq x \leq 3$, $0 \leq y \leq 2$, and $0 \leq z \leq 1$.

In one embodiment, $XY_4$ is selected from the group consisting of $X'[O_{4-x,}Y'_x]$, $X'[O_{4-y,}Y'_{2y}]$, and mixtures thereof, and x and y are both 0. Stated differently, $XY_4$ is an anion selected from the group consisting of $PO_4$, $SiO_4$, $GeO_4$, $VO_4$, $AsO_4$, $SbO_4$, $SO_4$, and mixtures thereof. Preferably, $XY_4$ is $PO_4$ or a mixture of $PO_4$ with another anion of the above-noted group (i.e., where X' is not P, Y' is not O, or both, as defined above). In one embodiment, $XY_4$ includes about 80% or more phosphate and up to about 20% of one or more of the above-noted anions.

In another embodiment, $XY_4$ is selected from the group consisting of $X'[O_{4-x,}Y'_x]$, $X'[O_{4-y,}Y'_{2y}]$, and mixtures thereof, wherein $0<x \leq 3$ and $0<y \leq 2$, and wherein a portion of the oxygen (O) in the $XY_4$ moiety is substituted with a halogen, S, N, or a mixture thereof.

In all embodiments described herein, moiety Z (when provided) is selected from the group consisting of Z is selected from the group consisting of a hydroxyl (OH), a halogen, and mixtures thereof. In the embodiment illustrated by general formula (I), $0 \leq e \leq 4$. In one particular embodiment, e=0. In another particular embodiment, $0<e \leq 1$. In one embodiment, Z is selected from the group consisting of OH, F (Fluorine), Cl (Chlorine), Br (Bromine), and mixtures thereof. In another embodiment, Z is OH. In another embodiment, Z is F, or a mixture of F with OH, Cl, or Br. Where the moiety Z is incorporated into the active material of the present invention, the active material may not take on a NASICON or olivine structural where p=3 or d=1, respectively. It is quite normal for the symmetry to be reduced with incorporation of, for example, halogens.

The composition of the electrode active material, as well as the stoichiometric values of the elements of the composition, are selected so as to maintain electroneutrality of the electrode active material. The stoichiometric values of one or more elements of the composition may take on non-integer values. Preferably, the $XY_4$ moiety is, as a unit moiety, an anion having a charge of −2, −3, or −4, depending on the selection of X', X'', X'''Y', and x and y. When $XY_4$ is a mixture of polyanions such as the preferred phosphate/phosphate substitutes discussed above, the net charge on the $XY_4$ anion may take on non-integer values, depending on the charge and composition of the individual groups $XY_4$ in the mixture.

In one particular embodiment, the electrode active material has an orthorhombic—dipyramidal crystal structure and belongs to the space group Pbnm (e.g. an olivine or triphylite material), and is represented by the nominal general formula (IV):

 

$$A_a[M_m,MI_n,MII_o]XY_4Z_e, \quad (IV)$$

wherein:

(a) the moieties A, M, MI, MII, X, Y and Z are as defined herein above;

(b) at least one of M, MI and MII is a redox active element, and ½[V(MI)+V(MII)]=V(M), wherein V(M) is the valence state of M, V(MI) is the valence state of MI, and V(MII) is the valence state of MII;

(c) $0<a\leq 2$, $0<m,n,o\leq 2$; and $0<e\leq 1$; and (d) the components of the moieties A, M, MI, MII, X, Y and Z, as well as the values for a, m, n, o, and e, are selected so as to maintain electroneutrality of the compound.

In one particular subembodiment, A of general formula (II) is Li, and $XY_4=PO_4$.

In another particular embodiment, the electrode active material has a rhombohedral (space group R-3) or monoclinic (space group Pbcn) NASICON structure, and is represented by the nominal general formula (V):

$$A_a[M_m,MI_n,MII_o](XY_4)_3Z_e, \quad (V)$$

wherein:

(a) the moieties A, M, MI, MII, X, Y and Z are as defined herein above;

(b) at least one of M, MI and MII is a redox active element, and $\frac{1}{2}[V(MI)+V(MII)]=V(M)$, wherein V(M) is the valence state of M, V(MI) is the valence state of MI, and V(MII) is the valence state of MII;

(c) $0<a\leq 5$, $1<m,n,o\leq 3$; and $0<e\leq 4$; and (d) the components of the moieties A, M, MI, MII, X, Y and Z, as well as the values for a, b, m, n, o, and e, are selected so as to maintain electroneutrality of the compound.

In one particular subembodiment, A of general formula (III) is Li, and $XY_4=PO_4$.

Methods of Manufacture

The particular starting materials employed will depend on the particular active material to be synthesized, reaction method employed, and desired by-products. The active materials of the present invention are synthesized by reacting alkali metal, M, MI, MII, and $XY_4$-containing compounds, at a temperature and for a time sufficient to form the desired reaction product. As used herein, the term "containing" includes compounds which contain the particular component, or react to form the particular component so specified.

Sources of alkali metal include any of a number of alkali metal-containing salts or ionic compounds. Lithium, sodium, and potassium compounds are preferred, with lithium being particularly preferred. A wide range of such materials is well known in the field of inorganic chemistry. Examples include the alkali metal-containing fluorides, chlorides, bromides, iodides, nitrates, nitrites, sulfates, hydrogen sulfates, sulfites, bisulfites, carbonates, bicarbonates, borates, phosphates, silicates, antimonates, arsenates, germanates, oxides, acetates, oxalates, and the like. Hydrates of the above compounds may also be used, as well as mixtures thereof. The mixtures may contain more than one alkali metal so that a mixed alkali metal active material will be produced in the reaction.

Sources of M, MI and MII include fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, and oxalates of the same. Hydrates may also be used. The element M, MI and MII in the starting material may have any oxidation state, depending on the oxidation state required in the desired product and the oxidizing or reducing conditions contemplated. It should be noted that many of the above-noted compounds may also function as a source of the $XY_4$ moiety.

As noted above, the active materials of the present invention can contain one or more $XY_4$ groups, or can contain a phosphate group that is completely or partially substituted by one or more other $XY_4$ moieties, which will also be referred to as "phosphate replacements" or "modified phosphates." Thus, active materials are provided according to the invention wherein the $XY_4$ moiety is a phosphate group that is completely or partially replaced by such moieties as $SiO_4$, $GeO_4$, $VO_4$, $AsO_4$, $SbO_4$, $SO_4$, and mixtures thereof. Analogues of the above oxygenate anions where some or all of the oxygen is replaced by sulfur are also useful in the active materials of the invention, with the exception that the sulfate group may not be completely substituted with sulfur. For example, thiomonophosphates may also be used as a complete or partial replacement for phosphate in the active materials of the invention. Such thiomonophosphates include the anions $(PO_3S)^{3-}$, $(PO_2S_2)^{3-}$, $(POS_3)^{3-}$, and $(PS_4)^{3-}$, and are most conveniently available as the sodium, lithium, or potassium derivative. Non-limiting examples of sources of monofluoromonophosphates include, without limitation, $Na_2PO_3F$, $K_2PO_3F$, $(NH_4)_2PO_3F \cdot H_2O$, $LiNaPO_3F \cdot H_2O$, $LiKPO_3F$, $LiNH_4PO_3F$, $NaNH_4PO_3F$, $NaK_3(PO_3F)_2$ and $CaPO_3F \cdot 2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

Sources for the $XY_4$ moiety are common and readily available. For example, where X is Si, useful sources of silicon include orthosilicates, pyrosilicates, cyclic silicate anions such as $(Si_3O_9)^{6-}$, $(Si_6O_{18})^{12-}$ and the like, and pyrocenes represented by the formula $[(SiO_3)^{2-}]_n$, for example $LiAl(SiO_3)_2$. Silica or $SiO_2$ may also be used. Representative arsenate compounds that may be used to prepare the active materials of the invention wherein X is As include $H_3AsO_4$ and salts of the anions $[H_2AsO_4]^-$ and $[HAsO_4]^{2-}$. Where X is Sb, antimonate can be provided by antimony-containing materials such as $Sb_2O_5$, $M^ISbO_3$ where $M^I$ is a metal having oxidation state 1+, $M^{III}SbO_4$ where $M^{III}$ is a metal having an oxidation state of 3+, and $M^{II}Sb_2O_7$ where $M^{II}$ is a metal having an oxidation state of 2+. Additional sources of antimonate include compounds such as $Li_3SbO_4$, $NH_4H_2SbO_4$, and other alkali metal and/or ammonium mixed salts of the $[SbO_4]^{3-}$ anion. Where X is S, sulfate compounds that can be used include alkali metal and transition metal sulfates and bisulfates as well as mixed metal sulfates such as $(NH_4)_2Fe(SO_4)_2$, $NH_4Fe(SO_4)_2$ and the like. Finally, where X is Ge, a germanium containing compound such as $GeO_2$ may be used to synthesize the active material.

Where Y' of the $X'O_{4-x}Y'_x$ and $X'O_{4-y}Y'_{2y}$ moieties is F, sources of F include ionic compounds containing a fluoride ion ($F^-$) or hydrogen difluoride ion ($HF_2^-$). The cation may be any cation that forms a stable compound with the fluoride or hydrogen difluoride anion. Examples include 1+, 2+ and 3+ metal cations, as well as ammonium and other nitrogen-containing cations. Ammonium is a preferred cation because it tends to form volatile by-products that are readily removed from the reaction mixture. Similarly, to make $X'O_{4-x}N_x$, starting materials are provided that contain "x" moles of a source of nitride ion. Sources of nitride are among those known in the art including nitride salts such as $Li_3N$ and $(NH_4)_3N$.

As noted above, the active materials of the invention contain a mixture of A, M, MI, MII, $XY_4$, and (optionally) Z. A starting material may provide more than one of these components, as is evident in the list above. In various embodiments of the invention, starting materials are provided that combine, for example, the M and $PO_4$. As a general rule, there is sufficient flexibility to allow selection of starting materials containing any of the components of alkali metal A, M, MI, MII, $XY_4$, and (optionally) Z, depending on availability. Combinations of starting materials providing each of the components may also be used.

In general, any counterion may be combined with A, M, MI, MII, $XY_4$, and (optionally) Z. It is preferred, however, to select starting materials with counterions that give rise to the formation of volatile by-products during the reaction. Thus, it is desirable to choose ammonium salts, carbonates, bicarbonates, oxides, hydroxides, and the like, where possible. Starting materials with these counterions tend to form volatile by-products such as water, ammonia, and carbon dioxide, which can be readily removed from the reaction mixture. Similarly, sulfur-containing anions such as sulfate, bisulfate, sulfite, bisulfite and the like tend to result in volatile sulfur oxide by-products. Nitrogen-containing anions such as nitrate and nitrite also tend to give volatile $NO_x$ by-products.

One method for preparing the active materials of the present invention is via the hydrothermal treatment of the requisite starting materials. In a hydrothermal reaction, the starting materials are mixed with a small amount of a liquid (e.g. water), and heated in a pressurized vessel or bomb at a temperature that is relatively lower as compared to the temperature necessary to produce the active material in an oven at ambient pressure. Preferably, the reaction is carried out at a temperature of about 150° C. to about 450° C., under pressure, for a period of about 4 to about 48 hours, or until a reaction product forms.

The active materials of the present invention can also be synthesized via a solid state reaction, with or without simultaneous oxidation or reduction of oxidizable/reducible elements of M, MI and MII, by heating the requisite starting materials at an elevated temperature for a given period of time, until the desired reaction product forms.

In a solid-state reaction, the starting materials are provided in powder or particulate form, and are mixed together by any of a variety of procedures, such as by ball milling, blending in a mortar and pestle, and the like. Typically, the starting materials are ball milled for 12–18 hours, rolling at a rate of 20 rpm.

Thereafter the mixture of powdered starting materials may be compressed into a pellet and/or held together with a binder material (which may also serve as a source of the reducing agent) to form a closely cohering reaction mixture. The reaction mixture is heated in an oven, generally at a temperature of about 400° C. or greater, until a reaction product forms.

The reaction may be carried out under reducing or oxidizing conditions. Reducing conditions may be provided by performing the reaction in a "reducing atmosphere" such as hydrogen, ammonia, carbon monoxide, methane, or mixtures thereof, or other suitable reducing gas. Alternatively or in addition thereto, the reduction may be carried out in situ by including in the reaction mixture a reducent that will participate in the reaction to reduce M, MI and/or MII, and produce by-products that will not interfere with the active material when used later in an electrode or an electrochemical cell. Reduction can also be accomplished by synthesizing the active materials of the present invention via a thermite reaction, wherein the M, MI and/or MII is reduced by a granular or powdered metal present in the reaction mixture.

In one embodiment, the reducent is elemental carbon, wherein the reducing power is provided by simultaneous oxidation of carbon to carbon monoxide and/or carbon dioxide. An excess of carbon, remaining after the reaction, is intimately mixed with the product active material and functions as a conductive constituent in the ultimate electrode formulation. Accordingly, excess carbon, on the order of 100% or greater, may be used. The presence of carbon particles in the starting materials also provides nucleation sites for the production of the product crystals.

The source of reducing carbon may also be provided by an organic material that forms a carbon-rich decomposition product, referred to herein as a "carbonaceous material," and other by-products upon heating under the conditions of the reaction. At least a portion of the organic precursor, carbonaceous material and/or by-products formed functions before, during and/or after the organic precursor undergoes thermal decomposition, as a reducent during the synthesis reaction for the active material. Such precursors include any liquid or solid organic material (e.g. sugars and other carbohydrates, including derivatives and polymers thereof).

Although the reaction may be carried out in the presence of oxygen, the reaction is preferably conducted under an essentially non-oxidizing atmosphere so as not to interfere with the reduction reactions taking place. An essentially non-oxidizing atmosphere can be achieved through the use of a vacuum, or through the use of inert gases such as argon, nitrogen, and the like.

Preferably, the particulate starting materials are heated to a temperature below the melting point of the starting materials. The temperature should be about 400° C. or greater, and desirably about 450° C. or greater. CO and/or $CO_2$ evolve during the reaction. Higher temperatures favor CO formation. Some of the reactions are more desirably conducted at temperatures greater than about 600° C.; most desirably greater than about 650° C. Suitable ranges for many reactions are from about 500 to about 1200° C.

At about 700° C. both the C→CO and the C→$CO_2$ reactions are occurring. At closer to about 600° C. the C→$CO_2$ reaction is the dominant reaction. At closer to about 800° C. the C→CO reaction is dominant. Since the reducing effect of the C→$CO_2$ reaction is greater, the result is that less carbon is needed per atomic unit of $M^I$ and/or $M^{II}$ to be reduced.

The starting materials may be heated at ramp rates from a fraction of a degree up to about 10° C. per minute. In some cases, for example where continuously heated rotary furnaces are employed, the ramp rate may be significantly higher. Once the desired reaction temperature is attained, the reactants (starting materials) are held at the reaction temperature for a time sufficient for the reaction to occur. Typically, the reaction is carried out for several hours at the final reaction temperature.

After the reaction is complete, the products are preferably cooled from the elevated temperature to ambient (room) temperature (i.e., about 10° C. to about 40° C.). It is also possible to quench the products to achieve a higher cooling rate, for example on the order of about 100° C./minute. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

Electrochemical Cells

To form an electrode, the active material of the present invention may be combined with a polymeric binder (e.g. polyvinylidene difluoride (PVdF) and hexafluoropropylene (HFP)) in order to form a cohesive mixture. The mixture is then placed in electrical communication with a current collector which, in turn, provides electrical communication between the electrode and an external load. The mixture may be formed or laminated onto the current collector, or an electrode film may be formed from the mixture wherein the current collector is embedded in the film. Suitable current collectors include reticulated or foiled metals (e.g. aluminum, copper and the like). An electrically conductive diluent or agent (e.g. a carbon such as carbon black and the like) may be added to the mixture so as to increase the electrical conductivity of the electrode. In one embodiment, the electrode material is pressed onto or about the current collector, thus eliminating the need for the polymeric binder. In one embodiment, the electrode contains 5 to 30% by weight electrically conductive agent, 3 to 20% by weight binder, and the remainder being the electrode active material.

To form an electrochemical cell, a solid electrolyte or an electrolyte-permeable separator is interposed between the electrode and a counter-electrode. In one embodiment, the electrolyte contains a solvent selected from the group consisting of the electrolyte comprises a lithium salt and a solvent selected from the group consisting of dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof; and 5 to 65% by weight of an alkali metal salt. Preferred solvent combinations include EC/DMC, EC/DEC, EC/DPC and EC/EMC. In one embodiment, the counter-electrode contains an intercalation active material selected from the group consisting of a transition metal oxide, a metal chalcogenide, carbon (e.g. graphite), and mixtures thereof. Counter electrodes, electrolyte compositions, and methods for making the same, among those useful herein, are described in U.S. Pat. No. 5,700,298, Shi et al., issued Dec. 23, 1997; U.S. Pat. No. 5,830,602, Barker et al., issued Nov. 3, 1998; U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Electrochemical cells composed of electrodes (including polymer-type stacked cells and cylindrical-type cells), electrolytes and other materials, among those useful herein, are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill, issued Jan. 9, 1996; U.S. Pat. No. 5,660,948, Barker, issued Sep. 16, 1995; U.S. Pat. No. 5,869,208, Miyasaka, issued Feb. 9, 1999; U.S. Pat. No. 5,882,821, Miyasaka, issued Mar. 16, 1999; U.S. Pat. No. 5,616,436, Sonobe, et al., issued Apr. 1, 1997; and U.S. Pat. No. 6,306,215, Larkin, issued Oct. 23, 2001.

The following non-limiting examples illustrate the compositions and methods of the present invention.

EXAMPLE 1

An electrode active material having the formula $Li[Fe^{2+}_{0.90},Cu^{+}_{0.05},V^{3+}_{0.05}]PO_4$ is made as follows. The following starting materials are provided, and the synthesis reaction proceeds as follows.

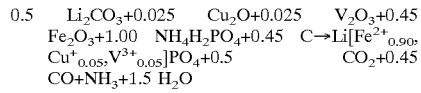

The reactants are pre-mixed according to the following proportions:

| | |
|---|---|
| 0.5 mol $Li_2CO_3$ (mol. wt. = 73.88 g/mol) | 36.9 g |
| 0.025 mol $Cu_2O$ (143.09 g/mol) | 3.58 g |
| 0.025 mol $V_2O_3$ (149.9 g/mol) | 3.75 g |
| 0.45 mol $Fe_2O_3$ (159.69 g/mol) | 71.9 g |
| 1.00 mol $NH_4H_2PO_4$ (132.06 g/mol) | 132 g |
| 0.45 mol carbon (12 g/mol) | 5.40 g |

The above starting materials are combined and ball milled to mix the particles. Thereafter, the particle mixture is pelletized. The pelletized mixture is heated, preferably in a flowing inert atmosphere (e.g. argon), until a reaction product forms. The sample is removed from the oven and cooled.

A suitable test electrochemical cell containing the $Li[Fe^{2+}_{0.90},Cu^{+}_{0.05},V^{3+}_{0.05}]PO_4$ active material is constructed as follows. The positive electrode is prepared by solvent-casting a slurry of the active material, conductive carbon, binder and solvent. The conductive carbon used is Super P (commercially available from MMM Carbon). Kynar Flex 2801 (commercially available from Elf Atochem Inc.) is used as the binder, and electronic grade acetone as the solvent. The slurry is cast onto glass and a free-standing electrode film is formed as the solvent evaporates. The electrode film contains the following components, expressed in percent by weight: 80% active material, 8% Super P carbon, and 12% Kynar 2801 binder. A carbonaceous material capable of reversibly intercalating alkali metal ions is employed as the negative electrode. The electrolyte consists of ethylene carbonate (EC) and ethyl methyl carbonate (EMC) in a weight ratio of 2:1, and a 1 molar concentration of a compatible alkali metal-containing salt (e.g. $LiPF_6$). A glass fiber separator interpenetrated by the solvent and the salt is interposed between the positive and negative electrodes.

As a battery employing the $Li[Fe^{2+}_{0.90},Cu^{+}_{0.05},V^{3+}_{0.05}]PO_4$ active material as the positive electrode active material is charged, the $Li[Fe^{2+}_{0.90},Cu^{+}_{0.05},V^{3+}_{0.05}]PO_4$ active material undergoes the following reversible oxidation reaction.

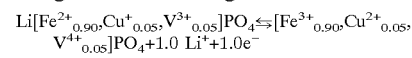

EXAMPLE 2

An electrode active material having the formula $Li[Fe^{2+}_{0.90},K^{+}_{0.05},V^{3+}_{0.05}]PO_4$ is made as follows. The following starting materials are provided, and the synthesis reaction proceeds as follows.

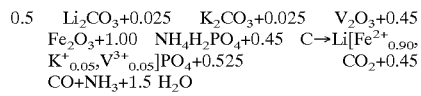

The reactants are pre-mixed according to the following proportions:

| | |
|---|---|
| 0.5 mol $Li_2CO_3$ (mol. wt. = 73.88 g/mol) | 36.9 g |
| 0.025 mol $K_2CO_3$ (138.21 g/mol) | 3.46 g |
| 0.025 mol $V_2O_3$ (149.9 g/mol) | 3.75 g |
| 0.45 mol $Fe_2O_3$ (159.69 g/mol) | 71.9 g |
| 1.00 mol $NH_4H_2PO_4$ (132.06 g/mol) | 132 g |
| 0.45 mol carbon (12 g/mol) | 5.40 g |

The above-noted mixture is subjected to the reaction conditions specified in Example 1 to form the $Li[Fe^{2+}_{0.90},K^+_{0.05},V^{3+}_{0.05}]PO_4$ active material. As a battery employing the $Li[Fe^{2+}_{0.90},K^+_{0.05},V^{3+}_{0.05}]PO_4$ as the positive electrode active material is charged, the $Li[Fe^{2+}_{0.90},K^+_{0.05},V^{3+}_{0.05}]PO_4$ active material undergoes the following reversible oxidation reaction.

$$Li[Fe^{2+}_{0.90},K^+_{0.05},V^{3+}_{0.05}]PO_4 \leftrightarrows [Fe^{3+}_{0.90},K^+_{0.05},V^{5+}_{0.05}]PO_4 + 1.0\ Li^+ + 1.0e^-$$

EXAMPLE 3

An electrode active material having the formula $Li[Fe^{2+}_{0.8},Ag^+_{0.1},Mn^{3+}_{0.1}]PO_4$ is made as follows. The following starting materials are provided, and the synthesis reaction proceeds as follows.

0.5 $Li_2CO_3$+0.050 $Ag_2O$+0.050 $Mn_2O_3$+0.40 $Fe_2O_3$+1.00 $NH_4H_2PO_4$+0.4 C→$Li[Fe^{2+}_{0.8},Ag^+_{0.1},Mn^{3+}_{0.1}]PO_4$+0.5 $CO_2$+0.4 CO+$NH_3$+1.5 $H_2O$

The reactants are pre-mixed according to the following proportions:

| | |
|---|---|
| 0.5 mol $Li_2CO_3$ (mol. wt. = 73.88 g/mol) | 36.9 g |
| 0.050 mol $Ag_2O$ (231.74 g/mol) | 11.6 g |
| 0.050 mol $Mn_2O_3$ (157.87 g/mol) | 7.89 g |
| 0.40 mol $Fe_2O_3$ (159.69 g/mol) | 63.9 g |
| 1.00 mol $NH_4H_2PO_4$ (132.06 g/mol) | 132 g |
| 0.40 mol carbon (12 g/mol) | 4.80 g |

The above-noted mixture is subjected to the reaction conditions specified in Example 1 to form the $Li[Fe^{2+}_{0.8},Ag^+_{0.1},Mn^{3+}_{0.1}]PO_4$ active material. As a battery employing the $Li[Fe^{2+}_{0.8},Ag^+_{0.1},Mn^{3+}_{0.1}]PO_4$ as the positive electrode active material is charged, the $Li[Fe^{2+}_{0.8},Ag^+_{0.1},Mn^{3+}_{0.1}]PO_4$ active material undergoes the following reversible oxidation reaction.

$$Li[Fe^{2+}_{0.8},Ag^+_{0.1},Mn^{3+}_{0.1}]PO_4 \leftrightarrows [Fe^{3+}_{0.8},Ag^{2+}_{0.1},Mn^{4+}_{0.1}]PO_4 + 1.0\ Li^+ + 1.0e^-$$

EXAMPLE 4

An electrode active material having the formula $Li[Fe^{2+}_{0.8},Ag^+_{0.1},Ti^{3+}_{0.1}]PO_4$ is made as follows. The following starting materials are provided, and the synthesis reaction proceeds as follows.

0.5 $Li_2CO_3$+0.050 $Ag_2O$+0.050 $Ti_2O_3$+0.40 $Fe_2O_3$+1.00 $NH_4H_2PO_4$+0.4 C→$Li[Fe^{2+}_{0.8},Ag^+_{0.1},Ti^{3+}_{0.1}]PO_4$+0.5 $CO_2$+0.4 CO+$NH_3$+1.5 $H_2O$

The reactants are pre-mixed according to the following proportions:

| | |
|---|---|
| 0.5 mol $Li_2CO_3$ (mol. wt. = 73.88 g/mol) | 36.9 g |
| 0.050 mol $Ag_2O$ (231.74 g/mol) | 11.6 g |
| 0.050 mol $Ti_2O_3$ (143.76 g/mol) | 7.19 g |
| 0.40 mol $Fe_2O_3$ (159.69 g/mol) | 63.9 g |
| 1.00 mol $NH_4H_2PO_4$ (132.06 g/mol) | 132 g |
| 0.40 mol carbon (12 g/mol) | 4.80 g |

The above-noted mixture is subjected to the reaction conditions specified in Example 1 to form the $Li[Fe^{2+}_{0.8},Ag^+_{0.1},Ti^{3+}_{0.1}]PO_4$ active material. As a battery employing the $Li[Fe^{2+}_{0.8},Ag^+_{0.1},Ti^{3+}_{0.1}]PO_4$ as the positive electrode active material is charged, the $Li[Fe^{2+}_{0.8},Ag^+_{0.1},Ti^{3+}_{0.1}]PO_4$ active material undergoes the following reversible oxidation reaction.

$$Li[Fe^{2+}_{0.8},Ag^+_{0.1},Ti^{3+}_{0.1}]PO_4 \leftrightarrows [Fe^{3+}_{0.8},Ag^{2+}_{0.1},Ti^{4+}_{0.1}]PO_4 + 1.0\ Li^+ + 1.0e^-$$

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A battery, comprising:
   (A) a first electrode comprising a compound represented by the nominal general formula:

$A_a[M_m,MI_n,MII_o](XY_4)_dZ_e,$ wherein:
   (i) A is selected from the group consisting of elements from Group I of the Periodic Table, and mixtures thereof, and $0 < a \leq 9$;
   (ii) at least one of M, MI and MII is a redox active element, $0 < m$, n, $o \leq 4$, and $\frac{1}{2}[V(MI)+V(MII)]=V(M)$, wherein V(M) is the valence state of M, V(MI) is the valence state of MI, and V(MII) is the valence state of MII, and wherein MI is selected from the group consisting of $Li^{1+}$, $K^{1+}$, $Na^{1+}$, $Ru^{1+}$, $Cs^{1+}$, and mixtures thereof;
   (iii) $XY_4$ is selected from the group consisting of $X'[O_{4-x},Y'_x]$, $X'[O_{4-y},Y'_{2y}]$, $X''S_4$, $[X_z''',X'_{1-z}]O_4$, and mixtures thereof, wherein:
   (a) X' and X''' are each independently selected from the group consisting of P, As, Sb, Si, Ge, V, S, and mixtures thereof;
   (b) X" is selected from the group consisting of P, As, Sb, Si, Ge, V, and mixtures thereof;
   (c) Y' is selected from the group consisting of a halogen, S, N, and mixtures thereof; and
   (d) $0 \leq x \leq 3$, $0 \leq y \leq 2$, $0 \leq z \leq 1$, and $1 \leq d \leq 3$; and
   (iv) Z is selected from the group consisting of a hydroxyl (OH), a halogen, and mixtures thereof, and $0 \leq e \leq 4$;
   wherein A, M, MI, MII X, Y, Z, a, m, n, o, d, and e are selected so as to maintain electroneutrality of the compound;
   (B) the battery further comprising a second electrode; and
   (C) an electrolyte.

2. The battery of claim 1, wherein A is selected from the group consisting of Li, K, Na, and mixtures thereof.

3. The battery of claim 1, wherein A is Li.

4. The battery of claim 1, wherein at least one of M and MII is a non-redox active element.

5. The battery of claim 1, wherein one of M and MII is a non-redox active element.

6. The battery of claim 1, wherein $XY_4$ is selected from the group consisting of $PO_4$, $AsO_4$, $SbO_4$, $SiO_4$, $GeO_4$, $VO_4$, $SO_4$, and mixtures thereof.

7. The battery of claim 1, wherein $XY_4$ is $PO_4$.

8. The battery of claim 1, wherein Z is selected from the group consisting of OH, F, Cl, Br, and mixtures thereof.

9. The battery of claim 1, wherein Z is F.

10. The battery of claim 1, wherein e=0.

11. The battery of claim 1, wherein the compound is represented by the nominal general formula:

$A_a[M_{m-n-o},MI_n,MII_o](XY_4)_dZ_e$.

12. The battery of claim 1, wherein the compound is represented by the nominal general formula:

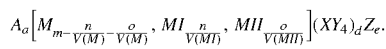

$A_a\left[M_{m-\frac{n}{V(M)}-\frac{o}{V(M)}}, MI_{\frac{n}{V(MI)}}, MII_{\frac{o}{V(MII)}}\right](XY_4)_dZ_e$.

13. The battery of claim 1, wherein d=1; A is Li; and $XY_4=PO_4$.

14. The battery of claim 1, wherein d=3; A is Li; and $XY_4=PO_4$.

15. The battery of claim 1, wherein the second electrode comprises an insertion active material.

16. The battery of claim 15, wherein the insertion active material is selected from the group consisting of a metal oxide, metal chalcogenide, carbon, graphite, and mixtures thereof.

17. The battery of claim 15, wherein the insertion active material is graphite.

18. The battery of claim 15, wherein the electrolyte comprises a lithium salt and a solvent selected from the group consisting of dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof.

19. The battery of claim 18, wherein the electrolyte comprises a solvent selected from the group consisting of EC/DMC, EC/DEC, EC/DPC and EC/EMC.

20. A battery, comprising:
(A) a first electrode comprising a compound represented by the nominal general formula:

$A_a[M_m,MI_n,MII_o](XY_4)_dZ_e$, wherein:
(i) A is selected from the group consisting of elements from Group I of the Periodic Table, and mixtures thereof, and $0<a\leq 9$;
(ii) at least one of M, MI and MII is a redox active element, $0<m$, n, $o\leq 4$, and $\frac{1}{2}[V(MI)+V(MII)]=V(M)$, wherein V(M) is the valence state of M, V(MI) is the valence state of MI;
(iii) $XY_4$ is selected from the group consisting of $X'[O_{4-x},Y'_x]$, $X'[O_{4-y},Y'_{2y}]$, $X''S_4$, $[X_z''',X'_{1-z}]O_4$, and mixtures thereof, wherein:
(a) X' and X''' are each independently selected from the group consisting of P, As, Sb, Si, Ge, V, S, and mixtures thereof;
(b) X'' is selected from the group consisting of P, As, Sb, Si, Ge, V, and mixtures thereof;
(c) Y' is selected from the group consisting of a halogen, S, N, and mixtures thereof; and
(d) $0\leq x\leq 3$, $0\leq y\leq 2$, $0\leq z\leq 1$, and $1\leq d\leq 3$; and
(iv) Z is selected from the group consisting of a hydroxyl (OH), a halogen, and mixtures thereof, and $0<e\leq 1$;
wherein A, M, MI, MII X, Y, Z, a, m, n, o, d, and e are selected so as to maintain electroneutrality of the compound;
(B) the battery further comprising a second electrode; and
(C) an electrolyte.

21. The battery of claim 20, wherein A is selected from the group consisting of Li, K, Na, and mixtures thereof.

22. The battery of claim 20, wherein A is Li.

23. The battery of claim 20, wherein M, MI and MII are each a redox active element.

24. The battery of claim 23, wherein MI is selected from the group consisting of redox active elements with a 1+ oxidation state, 2+ oxidation state, 3+ oxidation state and mixtures thereof.

25. The battery of claim 20, wherein at least one of M and MII is a non-redox active element.

26. The battery of claim 20, wherein MI is selected from the group consisting of $Cu^{1+}$, $Ag^{1+}$ and mixtures thereof.

27. The battery of claim 26, wherein at least one of M and MII is a non-redox active element.

28. The battery of claim 20, wherein MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo_{2+}$, $Si^{2+}$, $Sn^{2+}$, $Pb^{2+}$, and mixtures thereof.

29. The battery of claim 28, wherein at least one of M and MII is a non-redox active element.

30. The battery of claim 20, wherein MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof.

31. The battery of claim 30, wherein at least one of M and MII is a non-redox active element.

32. The battery of claim 20, wherein MI is selected from the group consisting of non-redox active elements with a 1+ oxidation state, 2+ oxidation state, 3+ oxidation state and mixtures thereof.

33. The battery of claim 32, wherein one of M and MII is a non-redox active element.

34. The battery of claim 32, wherein MI is selected from the group consisting of $Li^{1+}$, $K^{1+}$, $Na^{1+}$, $Ru^{1+}$, $Cs^{1+}$, and mixtures thereof.

35. The battery of claim 34, wherein one of M and MII is a non-redox active element.

36. The battery of claim 32, wherein MI is selected from the group consisting of $Be^{2+}$, $Mg^{2+}$, $Ca^{2+}$, $Sr^{2+}$, $Ba^{2+}$, $Zn^{2+}$, $Cd^{2+}$, $C^{2+}$, $Ge^{2+}$.

37. The battery of claim 36, wherein one of M and MII is a non-redox active element.

38. The battery of claim 32, wherein MI is selected from the group consisting of $Be^{2+}$, $Mg^{2+}$, $Ca^{2+}$, $Sr^{2+}$, $Ba^{2+}$, and mixtures thereof.

39. The battery of claim 32, wherein MI is selected from the group consisting of $Zn^{2+}$, $Cd^{2+}$, and mixtures thereof.

40. The battery of claim 32, wherein MI is selected from the group consisting of $C^{2+}$, $Ge^{2+}$, and mixtures thereof.

41. The battery of claim 32, wherein MI is selected from the group consisting of $Sc^{3+}$, $Y^{3+}$, $B^{3+}$, $Al^{3+}$, $Ga^{3+}$ and mixtures thereof.

42. The battery of claim 20, wherein one of M and MII is a non-redox active element.

43. The battery of claim 20, wherein $XY_4$ is selected from the group consisting of $PO_4$, $AsO_4$, $SbO_4$, $SiO_4$, $GeO_4$, $VO_4$, $SO_4$, and mixtures thereof.

44. The battery of claim 20, wherein $XY_4$ is $PO_4$.

45. The battery of claim 20, wherein Z is selected from the group consisting of OH, F, Cl, Br, and mixtures thereof.

46. The battery of claim 20, wherein Z is F.

47. The battery of claim 20, wherein the compound is represented by the nominal general formula:

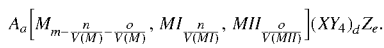
$A_a[M_{m-n-o}, MI_n, MII_o](XY_4)_d Z_e$.

48. The battery of claim 20 wherein the compound is represented by the nominal general formula:

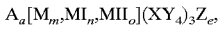
$A_a\left[M_{m-\frac{n}{V(M)}-\frac{o}{V(M)}}, MI_{\frac{n}{V(MI)}}, MII_{\frac{o}{V(MII)}}\right](XY_4)_d Z_e$.

49. The battery of claim 20, wherein d=1; A is Li; and $XY_4=PO_4$.

50. The battery of claim 20, wherein d=3; A is Li; and $XY_4=PO_4$.

51. The battery of claim 20, wherein the second electrode comprises an insertion active material.

52. The battery of claim 20, wherein the insertion active material is selected from the group consisting of a metal oxide, metal chalcogenide, carbon, graphite, and mixtures thereof.

53. The battery of claim 20, wherein the insertion active material is graphite.

54. The battery of claim 20, wherein the electrolyte comprises a lithium salt and a solvent selected from the group consisting of dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof.

55. The battery of claim 54, wherein the electrolyte comprises a solvent selected from the group consisting of EC/DMC, EC/DEC, EC/DPC and EC/EMC.

56. A battery, comprising:
(A) a first electrode comprising a compound represented by the nominal general formula:

$A_a[M_m, MI_n, MII_o](XY_4)_3 Z_e$, wherein:
(i) A is selected from the group consisting of elements from Group I of the Periodic Table, and mixtures thereof, and $0<a\leq 5$;
(ii) at least one of M, MI and MII is a redox active element, $1<m$, n, $o\leq 3$, and $\frac{1}{2}[V(MI)+V(MII)]=V(M)$, wherein V(M) is the valence state of M, V(MI) is the valence state of MI;
(iii) $XY_4$ is selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:
  (a) X' and X''' are each independently selected from the group consisting of P, As, Sb, Si, Ge, V, S, and mixtures thereof;
  (b) X'' is selected from the group consisting of P, As, Sb, Si, Ge, V, and mixtures thereof;
  (c) Y' is selected from the group consisting of a halogen, S, N, and mixtures thereof; and
  (d) $0\leq x\leq 3$, $0\leq y\leq 2$, and $0\leq z\leq 1$; and
(iv) Z is selected from the group consisting of a hydroxyl (OH), a halogen, and mixtures thereof and $0\leq e\leq 4$;
wherein A, M, MI, MII X, Y, Z, a, m, n, o, and e are selected so as to maintain electroneutrality of the compound;

(B) the battery further comprising a second electrode; and
(C) an electrolyte.

57. The battery of claim 56, wherein A is selected from the group consisting of Li, K, Na, and mixtures thereof.

58. The battery of claim 56, wherein A is Li.

59. The battery of claim 56, wherein M, MI and MII are each a redox active element.

60. The battery of claim 59, wherein MI is selected from the group consisting of redox active elements with a 1+ oxidation state, 2+ oxidation state, 3+ oxidation state and mixtures thereof.

61. The battery of claim 56, wherein at least one of M and MII is a non-redox active element.

62. The battery of claim 56, wherein MI is selected from the group consisting of $Cu^{1+}$, $Ag^{1+}$ and mixtures thereof.

63. The battery of claim 62, wherein at least one of M and MII is a non-redox active element.

64. The battery of claim 56, wherein MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof.

65. The battery of claim 64, wherein at least one of M and MII is a non-redox active element.

66. The battery of claim 56, wherein MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof.

67. The battery of claim 66, wherein at least one of M and MII is a non-redox active element.

68. The battery of claim 56, wherein MI is selected from the group consisting of non-redox active elements with a 1+ oxidation state, 2+ oxidation state, 3+ oxidation state and mixtures thereof.

69. The battery of claim 68, wherein one of M and MII is a non-redox active element.

70. The battery of claim 68, wherein MI is selected from the group consisting of $Li^{1+}$, $K^{1+}$, $Na^{1+}$, $Ru^{1+}$, $Cs^{1+}$, and mixtures thereof.

71. The battery of claim 70, wherein one of M and MII is a non-redox active element.

72. The battery of claim 68, wherein MI is selected from the group consisting of $Be^{2+}$, $Mg^{2+}$, $Ca^{2+}$, $Sr^{2+}$, $Ba^{2+}$, $Zn^{2+}$, $Cd^{2+}$, $C^{2+}$, $Ge^{2+}$.

73. The battery of claim 72, wherein one of M and MII is a non-redox active element.

74. The battery of claim 68, wherein MI is selected from the group consisting of $Be^{2+}$, $Mg^{2+}$, $Ca^{2+}$, $Sr^{2+}$, $Ba^{2+}$, and mixtures thereof.

75. The battery of claim 68, wherein MI is selected from the group consisting of $Zn^{2+}$, $Cd^{2+}$, and mixtures thereof.

76. The battery of claim 68, wherein MI is selected from the group consisting of $C^{2+}$, $Ge^{2+}$, and mixtures thereof.

77. The battery of claim 68, wherein MI is selected from the group consisting of $Sc^{3+}$, $Y^{3+}$, $B^{3+}$, $Al^{3+}$, $Ga^{3+}$ and mixtures thereof.

78. The battery of claim 56, wherein one of M and MII is a non-redox active element.

79. The battery of claim 56, wherein $XY_4$ is selected from the group consisting of $PO_4$, $AsO_4$, $SbO_4$, $SiO_4$, $GeO_4$, $VO_4$, $SO_4$, and mixtures thereof.

80. The battery of claim 56, wherein $XY_4$ is $PO_4$.

81. The battery of claim 56, wherein Z is selected from the group consisting of OH, F, Cl, Br, and mixtures thereof.

82. The battery of claim 56, wherein Z is F.

83. The battery of claim 56, wherein e=0.

84. The battery of claim 56, wherein the insertion active material is selected from the group consisting of a metal oxide, metal chalcogenide, carbon, graphite, and mixtures thereof.

85. The battery of claim 56, wherein the insertion active material is graphite.

86. The battery of claim 56, wherein the electrolyte comprises a lithium salt and a solvent selected from the group consisting of dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof.

87. The battery of claim 86, wherein the electrolyte comprises a solvent selected from the group consisting of EC/DMC, EC/DEC, EC/DPC and EC/EMC.

* * * * *